(No Model.)   2 Sheets—Sheet 1.

O. T. BUGG.
COTTON HARVESTER.

No. 329,810.   Patented Nov. 3, 1885.

WITNESSES:
Fred. G. Dieterich.
L. F. Gardner.

INVENTOR.
O. T. Bugg
per F. A. Lehmann
ATTORNEY

N. PETERS, Photo-Lithographer, Washington, D. C.

(No Model.) 2 Sheets—Sheet 2.
O. T. BUGG.
COTTON HARVESTER.
No. 329,810. Patented Nov. 3, 1885.
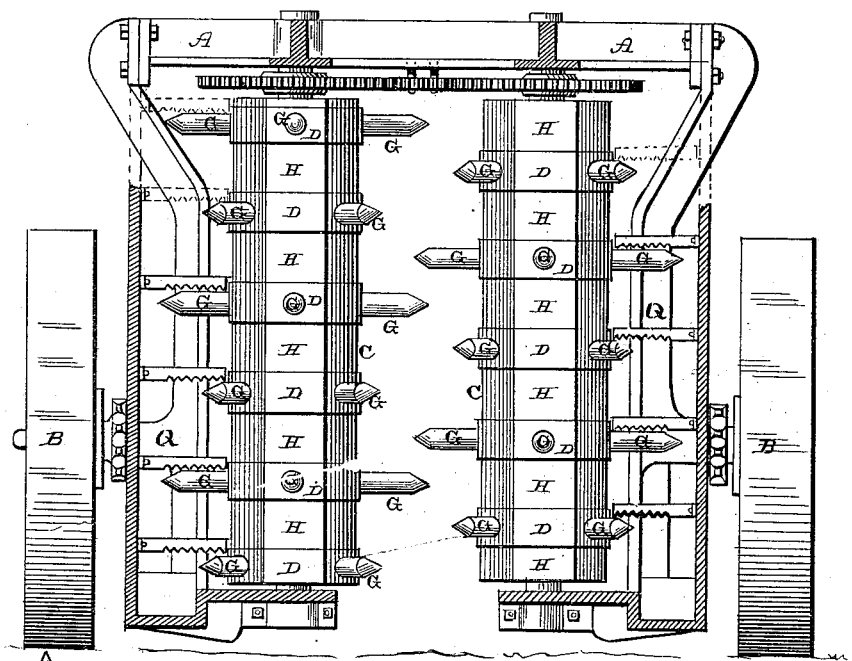
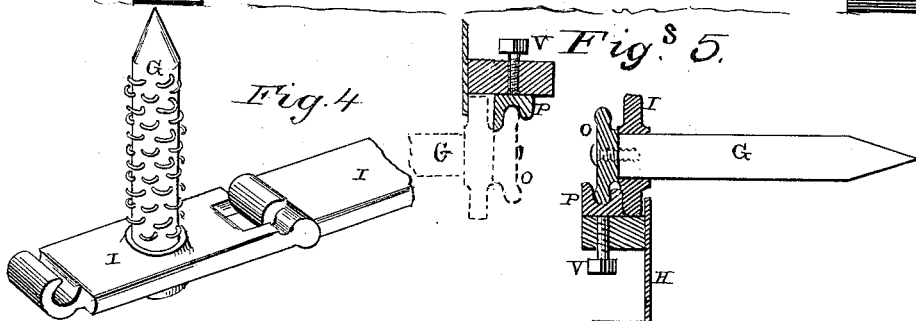
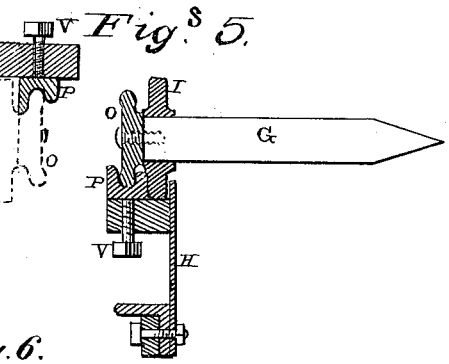
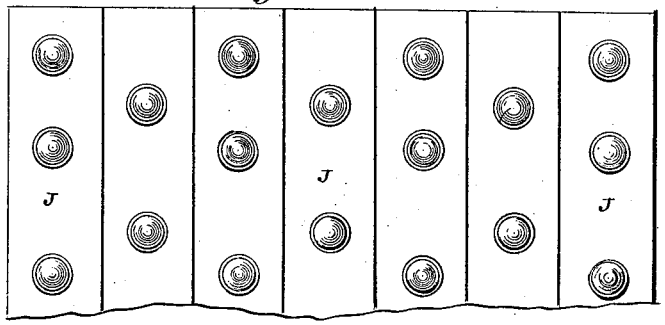
WITNESSES:
Fred. G. Dieterich
L. F. Gardner
INVENTOR.
O. T. Bugg,
per F. A. Lehmann,
ATTORNEY

United States Patent Office.

OWEN T. BUGG, OF NEW YORK, N. Y.

COTTON-HARVESTER.

SPECIFICATION forming part of Letters Patent No. 329,810, dated November 3, 1885.

Application filed July 3, 1885. Serial No. 170,621. (No model.)

*To all whom it may concern:*

Be it known that I, OWEN T. BUGG, of New York city, and State of New York, have invented certain new and useful Improvements in Cotton-Harvesters; and I do hereby declare the following to be a full, clear, and exact description of the invention, such as will enable others skilled in the art to which it pertains to make and use it, reference being had to the accompanying drawings, which form part of this specification.

My invention relates to an improvement in cotton-harvesters; and it consists, first, in the combination of a series of vertical horizontally-moving belts of any suitable construction with revolving barbed fingers, which are journaled in or upon the belts so as to move with them, and which fingers are made to revolve while the machine is in motion for the purpose of gathering the cotton; second, in a cotton-harvester, the combination of a series of vertical horizontally-moving belts of any suitable construction, revolving barbed fingers which are attached to and moved by the belts, and suitable mechanism or devices placed inside of the belts for causing the fingers to revolve first in one direction to gather the cotton, and then in the other direction to discharge the cotton; third, in the arrangement and combination of parts, which will be more fully described hereinafter.

The object of my invention is to produce a cotton-harvester in which a series of revolving fingers are carried by any suitable number of vertical belts which move horizontally, and which fingers can be made to rotate among the cotton-plants any desired length of time, and which fingers are carried backward by the belts at or about the same rate of speed that the machine is moved forward.

Figure 1:
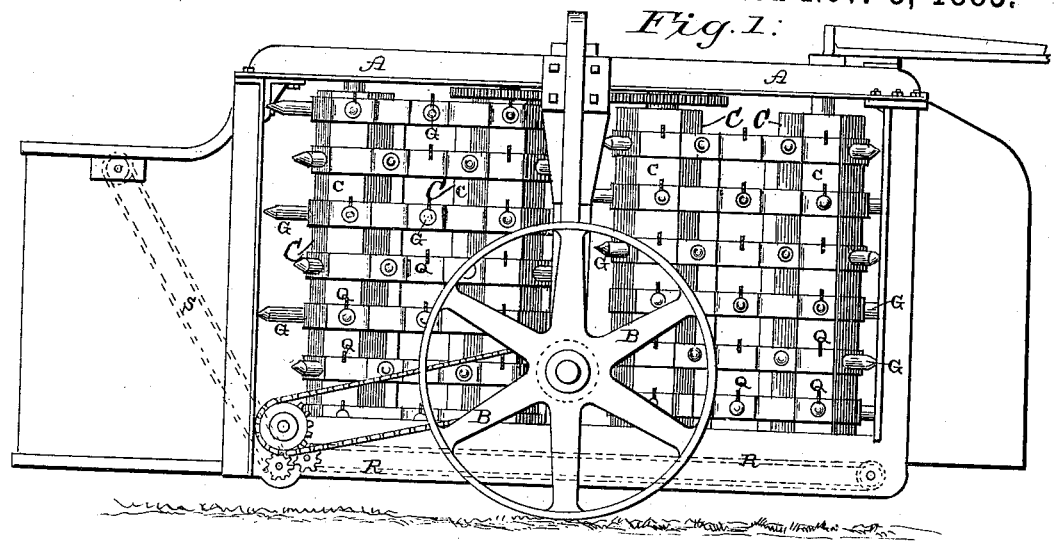
Figure 2:
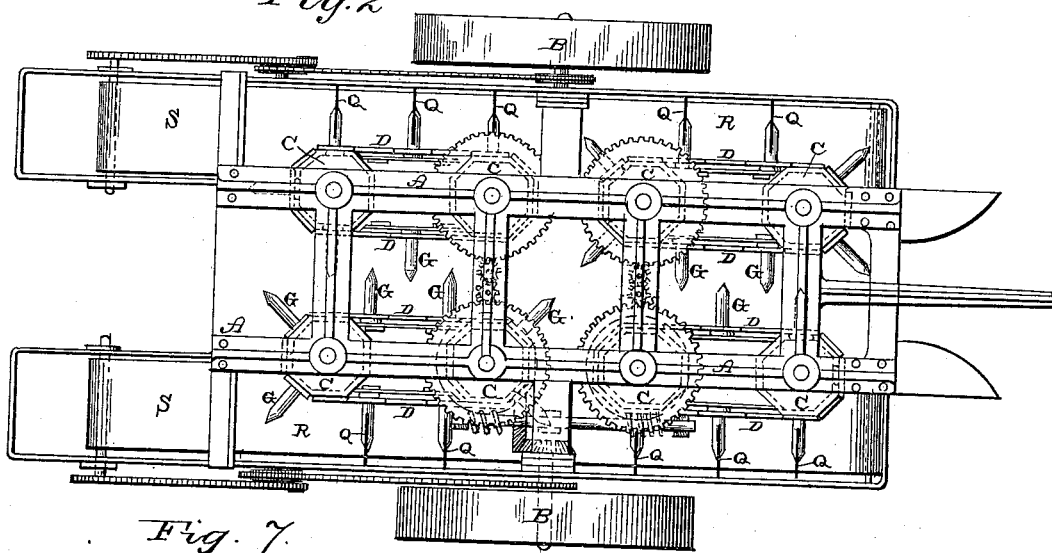
Figure 7:
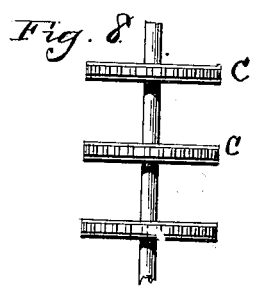
Figure 8:
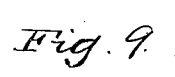
Figure 9:
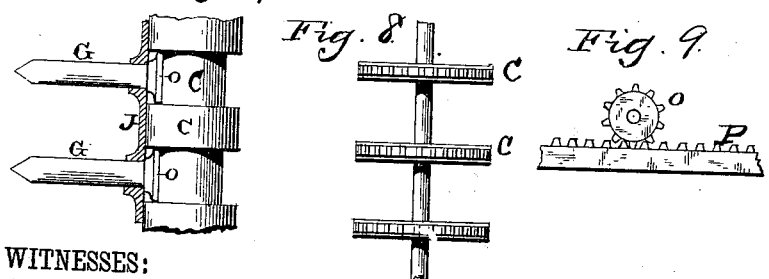

Figure 1 is a side elevation of a machine embodying my invention, a portion of the side of the machine being removed. Fig. 2 is a plan view of the same. Fig. 3 is an end view, partly in section. Figs. 4, 5, 6, and 7 are detail views. Figs. 8 and 9 show slight modifications of construction.

A represents a frame, of any desired construction, which is mounted upon the driving-wheel B. Only two wheels B are here shown, but a greater number may be used if so preferred. The driving mechanism for moving the belts and causing the fingers to revolve may be constructed either as shown in Fig. 2 or in any other way that may be preferred, as this driving mechanism forms no part of the present invention. Any driving mechanism that will answer the purpose of causing the belts to revolve backward at or about the same speed that the machine is moving forward may be used. As here shown, the driving mechanism is applied to one side only; but it may be placed upon both sides of the machine, so that both of the wheels B will perform an equal amount of work. These wheels B may also be provided with ratchets, so that the machine can be backed at any time without operating the belts and fingers.

The method of applying the ratchets to this class of harvesters being old and well known is not shown here for that reason.

Mounted upon the frame upon opposite sides are any suitable number of drums, C, which may be circular or polygonal in cross-section, as preferred, and which are placed at a distance apart according to the length of belts and the time that the fingers are to revolve among the cotton-plants. Passed around each pair of drums C is an endless belt or series of belts, D, which belt or belts carry a series of revolving barbed fingers, G, either of the construction here shown or any other that may be preferred. If there are to be a number of these belts D used, they will be separated any suitable distance apart, and the intervening spaces covered by a sheet-metal covering, H, of any suitable construction, as shown especially in Figs. 3 and 5, for the purpose of preventing the branches of the cotton-plants from catching in between the belts and either interfering with the forward motion of the machine or injuring the limbs of the plants. If a series of belts, D, are to be used, each one may be composed of a series of chain-links, I, which are made readily detachable from each other, as shown in Fig. 4, and either every link I or only every other link provided with a revolving finger, G, according to the length of the links and the distance apart it is desired to place the fingers upon the same belt. If it is desired to use but a single belt upon each pair of drums C, then the belt will be constructed of a series of vertical sections, J, as shown in Fig. 6, each section being just the length of the width of the belt. Where two series of belts, D, are used, they will be made to alternate, as shown in Figs. 1, 2, and 3, so that the fingers upon one belt will come just between the fingers upon the opposing belt, and thus insure that the fingers shall penetrate every part of the growing plants. Where a single belt is used, the fingers will be made to alternate, as shown in Fig. 6.

I do not limit myself in any manner to the construction of the belts for carrying the fingers G, nor to any manner of journaling the fingers in position in the links, as this may be changed in many different ways. As here shown, each finger passes loosely through the belt or link, and upon its inner end is rigidly secured either a frictional wheel, O, or a toothed pinion, as may be preferred. Inside of each belt there is placed a suitable rack or frictional track, P, with which the pinion or frictional wheel O engages. This rack or track P may be grooved, as shown in Fig. 5, so as to receive the edge of the wheel or pinion O, and thus prevent any endwise movement of the fingers G through the belt or link. As the fingers are carried along by the belt or belts, these wheels or pinions, by engaging with the racks or tracks, are caused to revolve in one direction, while the fingers are among the cotton-plants for the purpose of gathering the cotton, and then, after the fingers have left the plants and are passing through the box in which the cotton is dropped, these wheels or pinions engage with the other tracks upon the opposite side of the interior of the belts, and which racks or tracks are placed in an inverted position as regards the ones which cause the fingers to revolve in one direction to gather the cotton, and for the purpose of causing the fingers to revolve in an opposite direction to allow the cotton which has been gathered by the barbs upon the fingers to be cleaned or swept off by means of combs Q, or any other cleaning devices which may be used for this purpose. These combs are attached to the inner sides of the boxes, in which the cotton is discharged from the fingers, and extend across the intervening spaces, so as to bear directly upon the tops of the fingers, and thus sweep out the cotton which is held by the barbs. In the bottoms of these boxes are formed the usual conveyers, R, which carry the picked cotton back to the elevators S, where it is emptied into any suitable receptacle placed to receive it.

As here shown, there are two series of short belts placed upon each side of the frame, and these belts are geared together, so as to revolve at the same rate of speed; but I do not limit myself either to a single series of belts placed upon each side or to two series of belts, for it is evident that either one long continuous belt can be used, or any desired number of short belts. The longer the belt the longer the time that the fingers G are made to revolve among the cotton-plants for the purpose of gathering the ripe cotton. Where cylinders are used which carry revolving fingers, the fingers are inserted among the plants and withdrawn almost instantly, and thus the length of time which they shall revolve among the plants cannot be varied materially without increasing the size of the cylinders to a greater degree than is desirable.

This invention consists, broadly, in the use of vertical belts, which are made to move horizontally, and which carry fingers for gathering the cotton, which revolve first in one direction and then in the other, as above described.

For the purpose of allowing the frictional wheels or pinions O to pass around the drums C without any obstruction, the drums are grooved just deep enough to allow these wheels O to pass through the grooves without touching. In case it is not desired to use solid vertical drums, a series of pulleys of any suitable construction will be placed upon the vertical shafts and made fast to the same, so as to be revolved thereby. As shown in Fig. 5, in case wear should occur between the wheels O and the tracks P, the tracks may be moved forward by means of suitable set-screws, V, which bear against the under or upper edges of the track.

Having thus described my invention, I claim—

1. In a cotton-harvester, the combination of two or more vertical belts, means for moving them in a horizontal plane, and revolving fingers carried by said belts for gathering the cotton, substantially as set forth.

2. In a cotton-harvester, the combination of vertical drums or vertical series of pulleys, a series of belts passing around said drums or pulleys, revolving fingers carried by said belts, and means, substantially as shown, for causing the fingers to rotate in one direction to gather the cotton and in the opposite direction to discharge it, substantially as set forth.

3. In a cotton-harvester, the combination of two or more vertical endless belts placed opposite each other in the frame, means for moving such belts in a horizontal plane, revolving fingers carried by said belts, means, substantially as described, for rotating the fingers in one direction to gather the cotton and in the opposite direction to discharge the cotton, and stationary combs for cleaning the cotton from the fingers, substantially as set forth.

In testimony whereof I affix my signature in presence of two witnesses.

OWEN T. BUGG.

Witnesses:
 F. A. LEHMANN,
 L. L. BURKET.